United States Patent
Bai

(10) Patent No.: US 11,949,738 B2
(45) Date of Patent: Apr. 2, 2024

(54) METHOD AND DEVICE FOR MIGRATION TESTING IN A TRANSITION SPACE BETWEEN DIFFERENT TYPES OF CLOUD SYSTEMS

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Shi Bai, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

(*) Notice: Subject to any disclaimer, the term of this patent is extended or adjusted under 35 U.S.C. 154(b) by 0 days.

(21) Appl. No.: 17/791,436

(22) PCT Filed: Dec. 29, 2020

(86) PCT No.: PCT/CN2020/140871
§ 371 (c)(1),
(2) Date: Jul. 7, 2022

(87) PCT Pub. No.: WO2021/139569
PCT Pub. Date: Jul. 15, 2021

(65) Prior Publication Data
US 2023/0043613 A1      Feb. 9, 2023

(30) Foreign Application Priority Data
Jan. 10, 2020   (CN) .......................... 202010028201.8

(51) Int. Cl.
*H04L 67/1095* (2022.01)
*H04L 41/0893* (2022.01)

(52) U.S. Cl.
CPC ...... *H04L 67/1095* (2013.01); *H04L 41/0893* (2013.01)

(58) Field of Classification Search
CPC ..... H04L 67/1095; H04L 67/02; H04L 67/01; H04L 41/0893
(Continued)

(56) References Cited

U.S. PATENT DOCUMENTS

| | | | |
|---|---|---|---|
| 2004/0194055 | A1 | 9/2004 | Galloway et al. |
| 2013/0091285 | A1 | 4/2013 | Devarakonda et al. |

(Continued)

FOREIGN PATENT DOCUMENTS

| | | | | |
|---|---|---|---|---|
| CA | 2997302 A1 | * | 9/2019 | ......... G06F 9/45504 |
| CN | 103257878 A | | 8/2013 | |

(Continued)

OTHER PUBLICATIONS

Chinese Office Action corresponding to CN 202010028201.8; dated Oct. 10, 2022 (34 pages, including English translation).

(Continued)

*Primary Examiner* — Hee Soo Kim
(74) *Attorney, Agent, or Firm* — Myers Bigel, P.A.

(57) ABSTRACT

The migration method includes dividing each service system in a first cloud system into a plurality of modules; determining the relation between a module to be migrated among the plurality of modules and other modules; copying said module among the plurality of modules to a second cloud system, the type of the first cloud system being different from that of the second cloud system; and establishing a relation in the second cloud system to complete the migration of the first cloud system. The nature and gist of the present disclosure is that the migration of a module to be
(Continued)

migrated in the first cloud system is completed by establishing the association relation of the module to be migrated in the second cloud system.

19 Claims, 6 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2014/0149591 A1 | 5/2014 | Bhattacharya et al. | |
| 2015/0222702 A1* | 8/2015 | Salle | H04L 67/02 709/201 |
| 2015/0234644 A1* | 8/2015 | Ramanathan | H04L 47/82 709/226 |
| 2015/0278513 A1* | 10/2015 | Krasin | G06F 21/53 726/30 |
| 2016/0092127 A1* | 3/2016 | Markley | G06F 3/067 711/162 |
| 2016/0212202 A1* | 7/2016 | Birkestrand | H04L 67/1008 |
| 2019/0124018 A1* | 4/2019 | Zhang | G06F 9/5088 |
| 2019/0166125 A1* | 5/2019 | Bender | H04L 63/02 |
| 2019/0370138 A1* | 12/2019 | Tejerina | G06F 11/07 |

FOREIGN PATENT DOCUMENTS

| | | |
|---|---|---|
| CN | 103516733 A | 1/2014 |
| CN | 104303169 A | 1/2015 |
| CN | 105912389 A | 8/2016 |
| CN | 107566150 A | 1/2018 |
| CN | 109150964 A | 1/2019 |
| CN | 111782336 A | 10/2020 |
| CN | 111782353 A | 10/2020 |
| CN | 111786808 A | 10/2020 |
| CN | 111787045 A | 10/2020 |
| WO | WO-2013101154 A1 * | 7/2013 ............. G06F 21/00 |

OTHER PUBLICATIONS

International Search Report and Written Opinion of the International Searching Authority with English translation, International Application No. PCT/CN2020/140871, dated Mar. 29, 2021, 15 pp.
"Second Office Action", CN Application No. 202010028201.8, dated Mar. 31, 2023, 9 pp.
Extended European Search Report corresponding to European Patent Application No. 20911907.2 (9 pages) (dated Dec. 13, 2023).

* cited by examiner

METHOD AND DEVICE FOR MIGRATION TESTING IN A TRANSITION SPACE BETWEEN DIFFERENT TYPES OF CLOUD SYSTEMS

CROSS-REFERENCE TO RELATED APPLICATIONS

The present disclosure is a U.S. National Stage Application under 35 U.S.C. 0 371 of International Patent Application No. PCT/CN2020/140871, filed on Dec. 29, 2020, which is based on and claims priority of Chinese application for invention No. 202010028201.8, filed on Jan. 10, 2020, the disclosures of both of which are hereby incorporated into this disclosure by reference in their entireties.

TECHNICAL FIELD

The present disclosure relates to the technical field of cloud computing, and in particular, to a migration method for cloud system, a migration apparatus for cloud system, a hybrid cloud system, and a non-transitory computer-readable storage medium.

BACKGROUND

The current cloud platform is mainly divided into public cloud, private cloud, hybrid cloud and so on. In media, education, e-commerce and other industries, customers can choose to use public cloud computing platforms to improve system performance; in government, medical, financial and other industries, customers can choose to use private cloud computing platforms to improve system security and controllability.

In the related art, after determining the requirements of a user, a cloud platform of a type required by the user, such as a public cloud, a private cloud, etc., is directly built.

SUMMARY

According to some embodiments of the present disclosure, a migration method for cloud system is provided, comprising: dividing a business system in a first cloud system into multiple modules; determining an association relation between a module to be migrated of the multiple modules and other modules of the multiple modules; replicating the module to be migrated of the multiple modules to a second cloud system, wherein the first cloud system and the second cloud system are of different types; establishing association relation in the second cloud system to complete the migration of the first cloud system.

In some embodiments, the method further comprises: determining a dependent environment of the module to be migrated in the first cloud system; and replicating the dependent environment in the second cloud system to complete the migration of the first cloud system.

In some embodiments, the method further comprises: building, in the second cloud system, a subnet corresponding to a topology structure relating to the module to be migrated in the first cloud system, to complete the migration of the first cloud system.

In some embodiments, replicating the module to be migrated of the multiple modules to the second cloud system comprises: replicating the module to be migrated to a test area of the first cloud system; using association relation established in the test area, performing a first operation verification on the module to be migrated in the test area of the first cloud system; replicating the module to be migrated in the first cloud system to the second cloud system, in the case that the first verification is passed.

In some embodiments, the method further comprises: if the first verification fails, re-determining the association relation, so as to re-perform the first operation verification.

In some embodiments, the method further comprises: replicating a dependent environment of the module to be migrated and resources relating to the module to be migrated in the first cloud system to the test area for performing the first operation verification; if the first verification fails, re-determining the dependent environment, so as to re-perform the first operation verification.

In some embodiments, the method further comprises: building, in the test area, a subnet corresponding to a topology structure relating to the module to be migrated in the first cloud system, to perform the first operation verification.

In some embodiments, the method further comprises: using the association relation, in a hybrid cloud system composed of the first cloud system and the second cloud system, performing a second operation verification on module to be migrated in the second cloud system.

In some embodiments, the method further comprises: re-performing the first operation verification, in the case that the second verification fails.

In some embodiments, the first cloud system is a public cloud system, and the second cloud system is a private cloud system; the method further comprises: verifying whether protected data of the private cloud system are accessible through the public cloud system; performing an isolation process on the protected data in the private cloud system in the case that the protected data are accessible.

In some embodiments, the method further comprises: deleting the module to be migrated from the first cloud system, in the case that a hybrid cloud composed of the first cloud system and the second cloud system passes an operation test.

In some embodiments, the first cloud system is a private cloud system, and the second cloud system is a public cloud system; the method further comprises: isolating, from the public cloud system, protected data in the private cloud system.

According to other embodiments of the present disclosure, there is provided A migration apparatus for cloud system, comprising: a division unit for dividing a business system in a first cloud system into multiple modules; a determination unit for determining an association relation between a module to be migrated of the multiple modules and other modules of the multiple modules; a replication unit for replicating the module to be migrated of the multiple modules to a second cloud system, wherein the first cloud system and the second cloud system are of different types; an establishment unit for establishing association relation in the second cloud system to complete the migration of the first cloud system.

In some embodiments, the determination unit is used for determining a dependent environment of the module to be migrated in the first cloud system; and replicating the dependent environment to the second cloud system to complete the migration of the first cloud system.

In some embodiments, the establishment unit is used for building a corresponding subnet on the second cloud system according to a related topology structure of the module to be migrated in the first cloud system, so as to complete the migration of the first cloud system.

In some embodiments, the replication unit replicates the module to be migrated to a test area of the first cloud system. The apparatus further comprises a verification unit for using association relation established in the test area, performing a first operation verification on the module to be migrated in the test area; wherein if the first verification is passed, the replication unit replicates the module to be migrated in the first cloud system to the second cloud system.

In some embodiments, the determination unit is used for, if the first verification fails, re-determining the association relation, so as to re-perform the first operation verification.

In some embodiments, the replication unit replicates the dependent environment and related resources of the module to be migrated in the first cloud system to the test area for performing the first operation verification; if the first verification fails, the determination unit re-determines the dependent environment, so as to re-perform the first operation verification.

In some embodiments, the establishment unit is used for building, in the test area, a subnet corresponding to a topology structure relating to the module to be migrated in the first cloud system, to perform the first operation verification.

In some embodiments, the verification unit is used for, in a hybrid cloud system composed of the first cloud system and the second cloud system, performing a second operation verification on module to be migrated in the second cloud system using the association relation.

In some embodiments, the verification unit is used for, re-performing the first operation verification, in the case that the second verification fails.

In some embodiments, the first cloud system is a public cloud system, and the second cloud system is a private cloud system; the apparatus further comprises a verification unit for verifying whether protected data of the private cloud system are accessible through the public cloud system; a processing unit for performing an isolation process on the protected data in the private cloud system in the case that the protected data are accessible.

In some embodiments, the apparatus further comprises a processing unit for, deleting the module to be migrated from the first cloud system, in the case that a hybrid cloud composed of the first cloud system and the second cloud system passes an operation test.

In some embodiments, the first cloud system is a private cloud system, and the second cloud system is a public cloud system; the apparatus further comprises a processing unit for isolating, from the public cloud system, protected data in the private cloud system.

According to still other embodiments of the present disclosure, there is provided A migration apparatus for cloud system, comprising: a memory; a processor coupled to the memory, the processor configured to, based on instructions stored in the memory, carry out the migration method for cloud system according to any one of the above embodiments.

According to still further embodiments of the present disclosure, there is provided a hybrid cloud system, comprising: a migration apparatus for implementing the migration method for cloud system according to any one of the above embodiments.

According to still other embodiments of the present disclosure, there is provided a nonvolatile computer readable storage medium having stored thereon a computer program that, when executed by a processor, implements the migration method for cloud system according to any one of the above embodiments.

BRIEF DESCRIPTION OF THE DRAWINGS

The accompanying drawings, which are incorporated in and constitute a portion of this specification, illustrate embodiments of the present disclosure and, together with the description, serve to explain the principles of the present disclosure.

The present disclosure will be more clearly understood from the following detailed description with reference to the accompanying drawings, in which.

DETAILED DESCRIPTION

Figure 1:
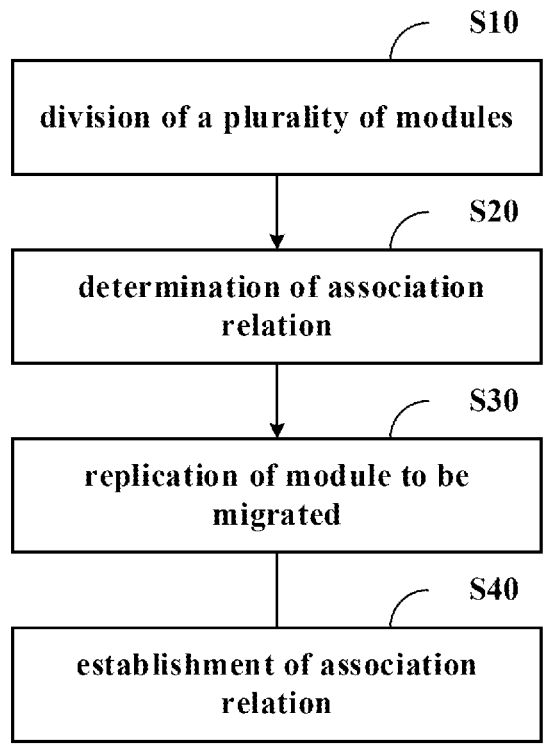
FIG. 1 shows a flowchart of some embodiments of a migration method for cloud system of the present disclosure.

Various exemplary embodiments of the present disclosure will now be described in detail with reference to the accompanying drawings. Notice that, Unless otherwise specified, the relative arrangement, numerical expressions and numerical values of the components and steps set forth in these examples do not limit the scope of the invention.

At the same time, it should be understood that, for ease of description, the dimensions of the various parts shown in the drawings are not drawn to actual proportions.

The following description of at least one exemplary embodiment is in fact merely illustrative and is in no way intended as a limitation to the invention, its application or use.

Techniques, methods, and apparatus known to those of ordinary skill in the relevant art may not be discussed in detail, but where appropriate, these techniques, methods, and apparatuses should be considered as part of the specification.

Of all the examples shown and discussed herein, any specific value should be construed as merely illustrative and not as a limitation. Thus, other examples of exemplary embodiments may have different values.

Notice that, similar reference numerals and letters are denoted by the like in the accompanying drawings, and therefore, once an article is defined in a drawing, there is no need for further discussion in the accompanying drawings.

As mentioned above, with the development of businesses and policy changes, current needs of users are not equal to future needs of users. Therefore, the fixed-type cloud systems in the related art cannot adapt to changes in user business requirements.

The above related technologies have the following problem: a cloud system built as a fixed type cannot adapt to changes in business requirements, resulting in poor flexibility of the cloud system. In view of this, the present disclosure provides a technical solution for cloud system migration, which can improve the flexibility of the cloud system.

In some embodiments, users may choose to expand a public cloud platform into a hybrid cloud platform due to substantially increased security requirements of users. For example, with the development of business and the continuous improvement of industry regulatory and security requirements, some powerful customers may choose to expand their public cloud platforms into hybrid cloud platforms.

For example, some media industries initially adopted public cloud platforms to meet the requirements of users for a large number of concurrent accesses. However, with the strengthening of intellectual property protection and the increasing requirements for user privacy and data security protection, some important media related to the national economy and people's livelihood have begun to build their own data centers. Moreover, a user may choose to replace an original platform architecture with a hybrid cloud, which can not only protect the security of core data, but also withstand network access traffic at extremely high peaks.

In some embodiments, due to the limited number of resources of private cloud platforms, the demand of some industries and departments cannot be met by means of private cloud or private information systems. In this case, users may choose to expand a private cloud platform into a hybrid cloud platform.

For example, a private cloud platform is initially adopted for the 12306 China Railway website; when the private cloud platform cannot withstand the service load during peak traffic hours, a hybrid cloud can be chosen instead. In this way, it is possible to not only protect the security of core data, but also withstand network access traffic at extremely high peaks.

In view of the above problem, the technical solution of the present disclosure can realize the expansion of a cloud platform under the condition that a complex business and management system has been built on a private cloud.

The present disclosure fully considers the technical risks that may be encountered in the process of expanding a public cloud platform or a private cloud platform to a hybrid cloud platform, and ensures that the cloud platform migration process is smooth and effective through a method comprising multiple state transition steps; while ensuring system security, steps with significant risks can be rolled back easily to ensure that the business system cannot not damaged. For example, it can be realized by the following embodiments.

FIG. 1 shows a flowchart of some embodiments of a migration method for cloud system of the present disclosure.

As shown in FIG. 1, the method comprises: step S10: division of a plurality of modules; step S20: determination of association relation; step S30: replication of module to be migrated; and step S40: establishment of association relation.

In step S10, a business system in a first cloud system is divided into multiple modules. For example, the business system can be an office system, a financial management system, a personnel management system, a website, a resource query system, and a resource management system; each business system can be divided into relatively independent functional modules.

In step S20, association relation between module to be migrated and other modules of the multiple modules are determined.

In step S30, the module to be migrated of the multiple modules are replicated to a second cloud system, wherein the first cloud system and the second cloud system are of different types. For example, the first cloud system may be a public cloud system, and the second cloud system may be a private cloud system; the first cloud system may be a private cloud system, and the second cloud system may be a public cloud system.

Figure 2:
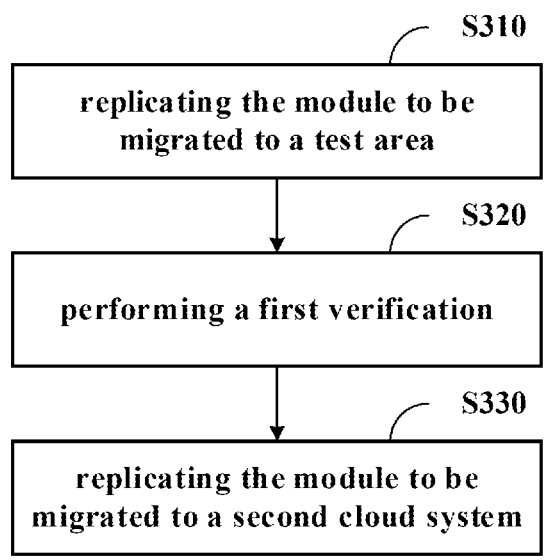
FIG. 2 shows a flowchart of some embodiments of step 30 in FIG. 1.

In this embodiment, step S30 may be executed as steps shown in FIG. 2.

FIG. 2 shows a flowchart of some embodiments of step 30 in FIG. 1.

As shown in FIG. 2, step S30 comprises: step S310: replicating the module to be migrated to a test area; step S320: performing a first verification; and step S330: replicating the module to be migrated to a second cloud system.

In step S310, the module to be migrated are replicated to a test area in the first cloud system.

In step S320, a first operation verification is performed, in the first cloud system, on the module to be migrated in the test area using association relation established in the test area.

In some embodiments, if the first verification fails, the association relation are re-determined, so as to re-perform the first operation verification.

In some embodiments, a dependent environment and related resources of the module to be migrated in the first cloud system are replicated to the test area for performing the first operation verification; if the first verification fails, the dependent environment is re-determined, so as to re-perform the first operation verification. For example, the related resources may be computing resources, data resources and the like of the cloud system.

In some embodiments, the dependent environment may comprise functional dependency, and data dependency. For example, a functional dependency may be that a module itself does not have a function such as file opening or sending, and needs to depend on the corresponding function of another module.

In some embodiments, according to the related topology structure of the module to be migrated in the first cloud system, a corresponding subnet is built in the test area to perform the first operation verification. For example, the affiliation between the module to be migrated and the subnet in the second cloud system is the same as the affiliation between the module to be migrated and the subnet in the first cloud system.

In step S330, if the first verification is passed, the module to be migrated in the first cloud system are replicated to the second cloud system.

After the module to be migrated in the first cloud system are replicated to the second cloud system, the migration can be continued through the remaining steps in FIG. 1.

In step S40, association relation are established in the second cloud system to complete the migration of the first cloud system.

In some embodiments, a dependent environment of the module to be migrated in the first cloud system is determined; the dependent environment is replicated to the second cloud system to complete the migration of the first cloud system.

In some embodiments, a corresponding subnet is established on the second cloud system according to a related topology structure of the module to be migrated in the first cloud system, so as to complete the migration of the first cloud system.

In some embodiments, the first cloud system is a public cloud system, and the second cloud system is a private cloud system. In this case, it is verified whether protected data of the private cloud system can be accessed through the public cloud system; an isolation process is performed on the protected data in private cloud systems in the case that the protected data are accessible.

In some embodiments, the first cloud system is a private cloud system, and the second cloud system is a public cloud system; and protected data in the private cloud system is isolated from the public cloud system.

In some embodiments, if the hybrid cloud composed of the first cloud system and the second cloud system passes the operation test, the module to be migrated are deleted from the first cloud system.

In some embodiments, in a hybrid cloud system composed of the first cloud system and the second cloud system, a second operation verification is performed on module to be migrated in the second cloud system using the association relation.

In some embodiments, if the second verification fails, the first operation verification is re-performed.

Figure 3:
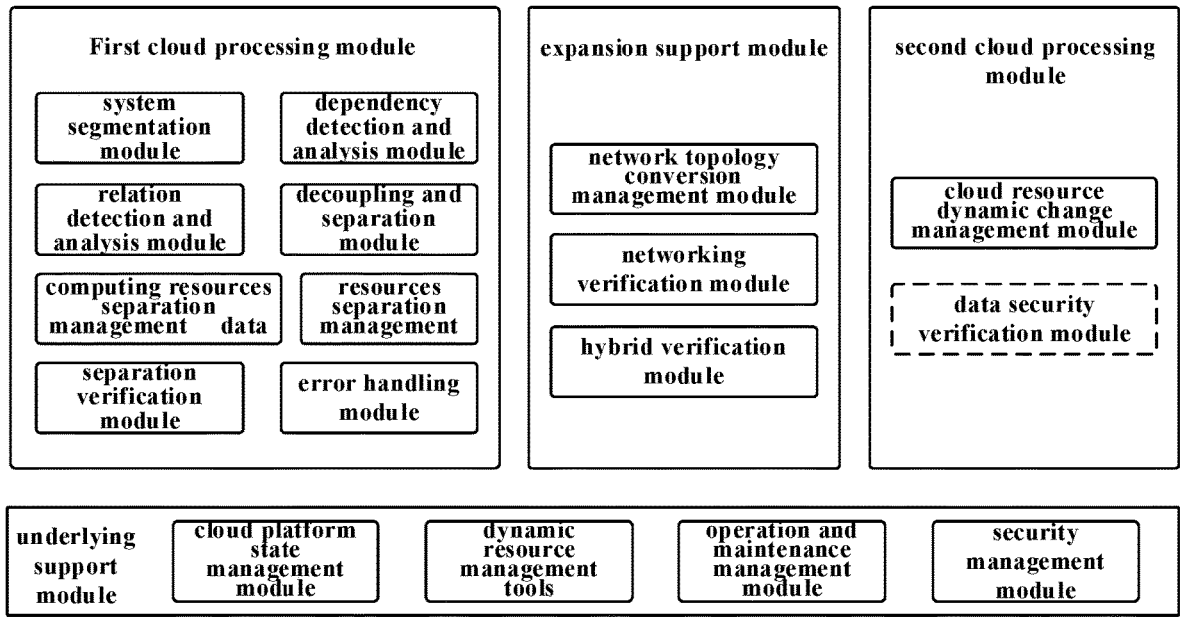
FIG. 3 shows a schematic diagram of some embodiments of a migration apparatus for cloud system of the present disclosure.

FIG. 3 shows a schematic diagram of some embodiments of a migration apparatus for cloud system of the present disclosure.

As shown in FIG. 3, the migration apparatus may comprise an underlying support module, a first cloud processing module, an expansion support module, and a second cloud processing module.

In some embodiments, the main function of the underlying support module is to provide overall underlying support for the expansion from the first cloud architecture to a hybrid cloud architecture. The underlying support module may comprise a cloud platform state management module, dynamic resource management tools, an operation and maintenance management module, and a security management module.

For example, the cloud platform state management module mainly checks the state of a cloud platform system and decides whether to proceed with a next expansion step; the dynamic resource management tools provide multi-platform resource management functions for the cloud platform expansion; the operation and maintenance management module is mainly responsible for the unified operation and maintenance management before and after the cloud platform expansion; the security management module is mainly responsible for the security of the cloud platform during and after the cloud platform extension.

In some embodiments, the main function of the first cloud processing module is to perform processing on each system on the first cloud before system architecture expansion, so as to ensure that the expansion will not cause system problems. The first cloud processing module may comprise a system segmentation module, a dependency detection and analysis module, a relation detection and analysis module, a decoupling and separation module, computing resources separation management, data resources separation management, a separation verification module, and an error handling module.

For example, the system segmentation module scans relatively independent application systems and services in the system, determines the boundaries of independent application systems, services and their related resources; formulates a system segmentation plan to determine which application systems and services will be remained on the public cloud platform and which applications systems and services will be expanded to a private cloud platform.

For example, the dependency detection and analysis module scans system dependencies of each independent module, comprising functional dependencies and data dependencies. Functional dependencies comprise basic dependencies of the application systems and services, such as operating system functions, system libraries, drivers, hardware functions, system basic components, programming framework components and the like on which the module depends; data dependencies comprise data sources, data files, data storage, and data backup, and the like.

For example, the relation detection and analysis module scans interrelationship between various independent modules, such as mutual data transmission, function invocation, process sequence, etc.

For example, after determining the dependencies and relations, the decoupling and separation module reconstructs the system dependencies required by the modules to be separated to ensure that the modules can operate independently; preserves the relations between the modules and other modules; when the relations needs to be changed, updates corresponding modules.

For example, the computing resources separation management is responsible for separating computing resources (such as cloud hosts, containers, etc.) related to the independent application systems in the original first cloud; replicating and migrating a portion of computing resources that need to be separated to a transition space (test area) separately assigned in the public cloud; and ensuring that the functions and data on which the computing resources depend are built together in the transition space.

For example, the data resources separation management is responsible for separating data resources (such as databases, block storage, etc.) related to the independent application systems in the original first cloud; replicating and migrating a portion of the data resources that need to be separated to the transition space separately assigned in the first cloud, and ensuring the consistency and integrity of the data.

For example, the separation verification module is responsible for verifying whether the functions and performance of the system can meet the target requirements after the computing and data resources are separated to the transition space.

For example, the error handling module is responsible for rolling back a failed severing module to its initial error-free state.

In some embodiments, the expansion support module is mainly used for: providing expansion support during the process of expanding the network of the first cloud to a second cloud, and assisting in completing the verification of the system. The expansion support module comprises a network topology conversion management module, a networking verification module, and a hybrid verification module.

For example, the network topology conversion management module is responsible for, according to the network topology of the original first cloud, extending the network topology to the second cloud, and maintaining data transmission of related modules between the second cloud and the first cloud. In the case where the first cloud is a private cloud and the second cloud is a public cloud, a portion of the private cloud that needs security isolation can be separated from the private cloud, so that the public cloud resources access a network transmission interface module of the private cloud for isolation.

For example, the networking verification module verifies the connectivity and network bandwidth of the newly formed hybrid cloud network; and verifies whether the data transmission between the separated resources of the second cloud and the network connection module of the first cloud is normal.

For example, the hybrid verification module is mainly responsible for functional and performance verification of related systems of the hybrid cloud, and for effectiveness verification of data isolation and security mechanisms.

In some embodiments, the main function of the second cloud processing module is to manage dynamically changed resources of the second cloud. The second cloud processing module mainly comprises a private cloud resource dynamic change management module. When the second cloud is a private cloud, the second cloud processing module further comprises a data security verification module.

For example, the private cloud resource dynamic change management module is mainly responsible for gradually expanding the number of resources in the second cloud; allocating private cloud resources on demand to adapt to business requirements and business development.

For example, the data security verification module is mainly responsible for verifying whether the involved data security mechanisms have an effect of security isolation after the private cloud has been isolated from the public cloud interface module.

In some embodiments, during the transition from the first cloud to the hybrid cloud, the overall system is mainly divided into four states according to the distribution of system resources. For example, the states mainly comprise an original state, a separated state, a hybrid verification state, and a hybrid state. The transition between various states of the system can be shown as FIG. 4.

Figure 4:
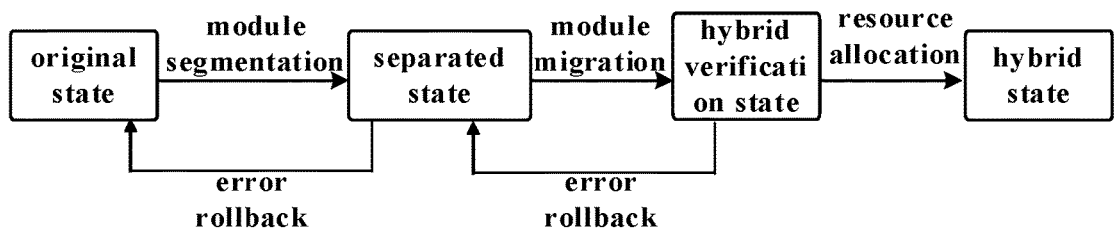
FIG. 4 shows a schematic diagram of some embodiments of a migration method for cloud system of the present disclosure.

FIG. 4 shows a schematic diagram of some embodiments of a migration method for cloud system of the present disclosure.

As shown in FIG. 4, the original state is a stable state of the first cloud before system expansion; the separated state is a system state in which some resources of the first cloud are separated from the first cloud, while maintaining the data interaction between the separated first cloud resources and the original first cloud.

The hybrid verification state is a state in which the separated modules are migrated to the second cloud. Only a smaller amount of resources are kept for the second cloud, so long as the number of resources can support the verification of system functions and performance.

The hybrid state is a final state of the system, in which resources on the second cloud are expanded according to business requirements to achieve a stable state of the hybrid cloud system.

The original state of the first cloud can be transitioned to the separated state through a module separation process; if a system error occurs during the verification of the separated state, the system can be returned to the original state through an error rollback process.

If the separated state is verified correctly, the system can be transitioned to the hybrid verification state through module migration. The system is fully tested and verified in the hybrid verification state. If there is an error in the verification, the system can be rolled back to the separated state and reprocessed according to the error; if the verification is correct in the hybrid verification state, the resources on the second cloud will be expanded, that is, the scale of the system on the second cloud will be expanded to form the final hybrid state.

In this way, through the design of the multiple states, the stability of the system expansion process can be ensured, and system problems caused by the destruction of the original system during the system expansion process can be prevented. To ensure that the system can be rolled back, the original system modules need to be reserved. When the system reaches the final stable state, the reserved resources can be gradually recycled.

In some embodiments, before expanding the first cloud system, it is necessary to know the basic situation of each system running on the first cloud. In this way, segmentation of independent modules can be performed as the basis for resource expansion on the second cloud. For example, the module segmentation of the original state system can be realized by the embodiment in FIG. 5.

Figure 5:
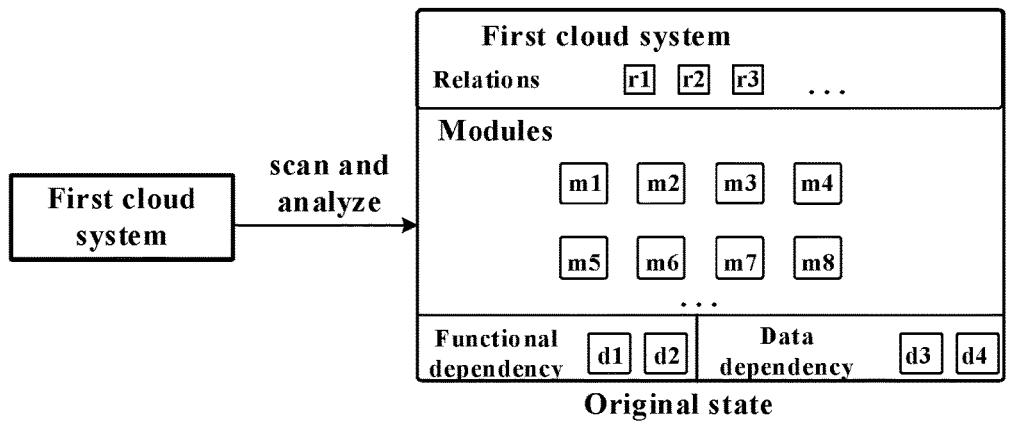
FIG. 5 shows a schematic diagram of other embodiments of the migration method for cloud system of the present disclosure.

FIG. 5 shows a schematic diagram of other embodiments of the migration method for cloud system of the present disclosure.

As shown in FIG. 5, the process of system module segmentation is substantially as follows.

All business program systems in the first cloud system are scanned and analyzed. For example, the business program systems comprise an office system, a financial management system, a personnel management system, a website, a resource query system, and a resource management system, etc. Independent modules (Modules) of the determined business program systems are represented as m1 to m8. Relevant resources of the independent modules, such as computing resources, data resources, and network resources, can be determined.

Relations between the various modules are analyzed. For example, association relation r1, r2, r3 between m1 to m8 may be determined. An association relation is a relationship of interaction such as invocation, access, and control that is required between two or more modules.

Functional dependencies (Dependency) of various modules are analyzed. For example, the functional dependencies can be d1, d2, etc.

Data dependencies of various modules are analyzed. For example, the data dependencies can be d3, d4, etc.

According to the needs of business expansion of a first cloud's customer and the segmentation of modules, modules that need to be expanded to the second cloud such as m3, m6, and m8 are determined; Functional dependency d1 and data dependency d4 of these modules are determined; An association relation r3 between these modules and modules retained in the first cloud environment is determined.

In some embodiments, before expanding some modules to the second cloud, a transition area (test area) is created in the original first cloud to temporarily process the modules to be expanded and facilitate the verification of module separation. For example, the transition from the original state to the separated state can be realized by the embodiment of FIG. 6.

Figure 6:
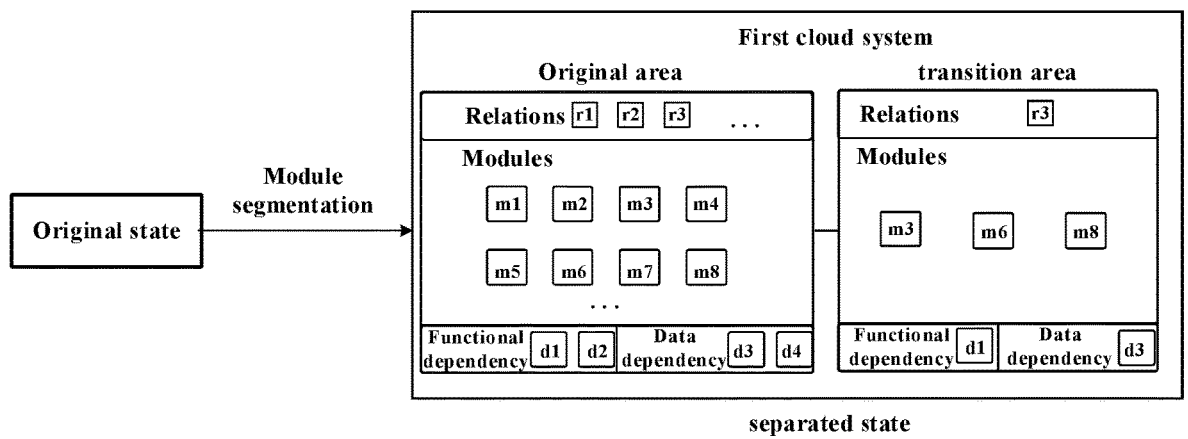
FIG. 6 shows a schematic diagram of still other embodiments of the migration method for cloud system of the present disclosure.

FIG. 6 shows a schematic diagram of still other embodiments of the migration method for cloud system of the present disclosure.

As shown in FIG. 6, the transition process from the original state to the separated state is substantially as follows.

According to a user's requirements, it can be determined that the modules to be expanded to the second cloud are m3, m6, and m8; their related functional dependency and data dependency are d1 and d4; they have an association relation r3 with modules retained on the public cloud.

A transition area, whose network environment is relatively independent from the original area, is created in the first cloud. The transition area is used for carrying the modules to be expanded. The function dependency d1 and the data dependency d4 of the modules to be expanded (module to be migrated) are established in the transition area. Relevant resources (such as computing resources and data resources) and network topology of the modules to be expanded m3, m6, and m8 are replicated to the resources in the transition area. An association relation (r3) between the modules to be expanded and the modules in the original area is established.

The modules to be expanded m3, m6, and m8 are activated and configured; An operation test and verification in terms of function, performance, security, and reliability is performed within the first cloud. If the test and verification is passed, this process is completed; if the test and verification fail, problems are searched and located.

If the problems can be solved in the separated state, the problems are solved and this process is completed; if the problems cannot be solved in the separated state, the system is rolled back to the original state to re-perform the analysis, evaluation and processing steps.

In some embodiments, the system which passes the verification in the separated state is the basis for the further expansion of the system. For the sake of safety and considering the cost of resources, in the process of expansion to a hybrid cloud, the separated state is first transitioned to a hybrid verification state, in which a small amount of resources are used to verify the validity of the expansion. For example, the transition from the separated state to the hybrid verification state can be realized by the embodiment of FIG. 7.

Figure 7:
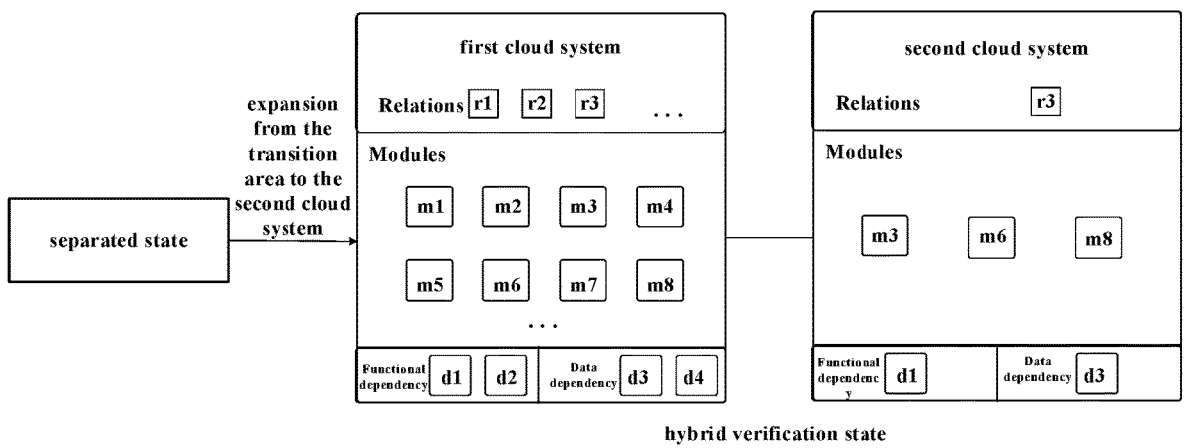
FIG. 7 shows a schematic diagram of further embodiments of the migration method for cloud system of the present disclosure.

FIG. 7 shows a schematic diagram of further embodiments of the migration method for cloud system of the present disclosure.

As shown in FIG. 7, the process of realizing the transition from the separated state to the hybrid verification state through the expansion of the transition area to the second cloud system is substantially as follows.

A hybrid cloud management platform is built on the first cloud platform. A network path between the first cloud and the second cloud is established to verify the network connection between the first cloud and the second cloud.

A subnet similar to that in the transition zone is built in the second cloud whiling ensuring that the subnet is on a scale that can withstand future services. Using the hybrid cloud management platform, the modules (m3, m6, m8), function dependency d1, data dependency d3 and other related instances in the transition area are replicated and migrated to the subnet built on the second cloud according to the principle of minimum scale; The association relation r3 between the modules in the second cloud and the modules in the public cloud is rebuilt.

The overall system formed by modules (m3, m6, m8) in the second cloud and modules (m1 to m8, etc.) in the first cloud is verified; a test and verification is performed in terms of function, performance, security, reliability, availability, scalability, maintainability and the like to comprehensively test the system status after resource migration. If the verification is passed, this process is completed; if the verification fails, causes are searched to solve the problems in the hybrid verification state.

If the problems can be solved in the hybrid verification state, the problems are solved and this process is completed; if the problems cannot be solved in the hybrid verification state, the system is rolled back to the separated state to re-perform the processes on the system.

In some embodiments, if the system passes the test and verification in the hybrid verification state, the construction of the overall hybrid cloud architecture is substantially successful. Next, the number of resources in the second cloud can be expanded to meet business needs. For example, the transition from the hybrid verification state to the hybrid state can be realized by the embodiment of FIG. 8.

Figure 8:
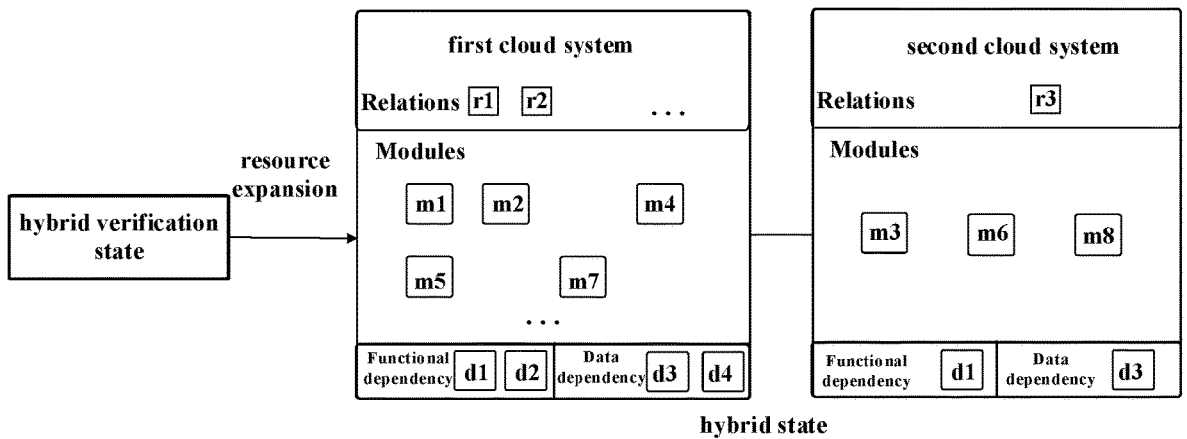
FIG. 8 shows a schematic diagram of further embodiments of the migration method for cloud system of the present disclosure.

FIG. 8 shows a schematic diagram of further embodiments of the migration method for cloud system of the present disclosure.

As shown in FIG. 8, the process of transitioning from the hybrid verification state to the hybrid state through resource expansion is substantially as follows.

If the bandwidth of the system is adjustable, the network bandwidth between the first cloud and the second cloud can be increased to meet the bandwidth requirements of business data transmission.

The amount of the resources of modules to be expanded m3, m6, and m8 in the second cloud can be increased. For example, the number of cloud host instances, the storage capacity, the instance size, the network bandwidth, etc. can be increased, so that the processing capacity of the system can meet the design requirements of the hybrid cloud.

After the system operates normally for a period of time without any problems, the modules m3, m6, and m8 originally reserved on the first cloud will be gradually removed, and then this process is completed.

In some embodiments, if the first cloud system is a public cloud system and the second cloud system is a private cloud system, data security on the private cloud can be verified through experimental access to data to be protected in the private cloud from the public cloud.

For example, access results can be viewed. If the data that needs to be protected can be accessed from the public cloud, data isolation and protection measures should be added on the private cloud. After data isolation and successful security verification, if the bandwidth is adjustable, the network bandwidth between the public cloud and the private cloud is increased to meet the bandwidth requirements for business data transmission.

In the above embodiment, a complete and effective method for expanding a first cloud platform to a hybrid cloud platform and expanding the system on the platform is proposed.

The process of expanding the entire system is controlled by the method of cloud platform state transition. Two cloud platform states that can be verified, namely a separated state and a hybrid verification state, are proposed. In this way, module expansion is easier to implement, and it also ensures the convenience of processing when expansion problems occur.

The system on the cloud platform is divided into modules, dependencies, and association relation, which is easy to untangle the complex system and make the system expansion more convenient and effective.

In the above embodiment, the migration of module to be migrated in the first cloud system is completed by establishing the association relation of the module to be migrated in the second cloud system. In this way, mutual migration can be realized between different types of cloud systems, so as to meet different business requirements and improve the flexibility of the cloud system.

Figure 9:
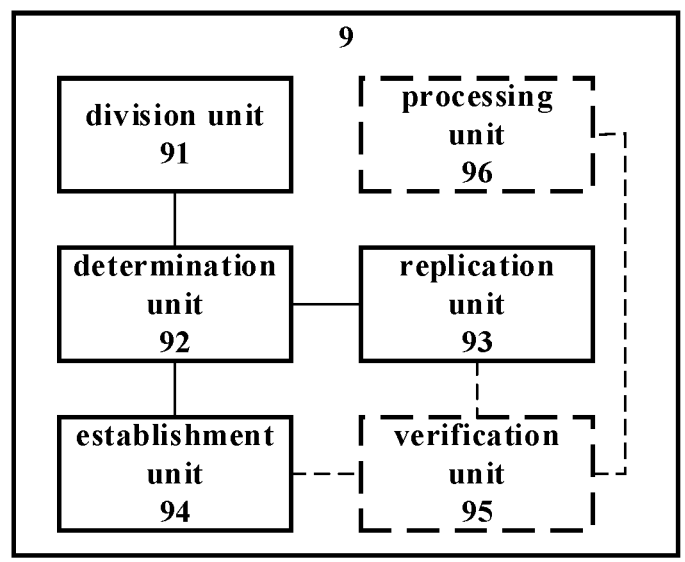
FIG. 9 shows a block diagram of some embodiments of a migration apparatus for cloud system of the present disclosure.

FIG. 9 shows a block diagram of some embodiments of a migration apparatus for cloud system of the present disclosure.

As shown in FIG. 9, the migration apparatus for cloud system comprises a division unit 91, a determination unit 92, a replication unit 93, and an establishment unit 94.

The division unit 91 is used for dividing a business system in a first cloud system into multiple modules.

The determination unit 92 is used for determining an association relation between a module to be migrated of the multiple modules and other modules of the multiple modules.

The replication unit 92 is used for replicating the module to be migrated of the multiple modules to a second cloud system, wherein the first cloud system and the second cloud system are of different types.

In some embodiments, the replication unit 93 replicates the module to be migrated to a test area of the first cloud system. The migration apparatus 9 further comprises a verification unit 95 for, using association relation established in the test area, performing a first operation verification on the module to be migrated in the test area; wherein if the first verification is passed, the replication unit 93 replicates the module to be migrated in the first cloud system to the second cloud system.

In some embodiments, the determination unit 92 is used for determining a dependent environment of the module to be migrated in the first cloud system; and the replication unit 93 is used for replicating the dependent environment to the second cloud system to complete the migration of the first cloud system.

In some embodiments, the determination unit 92 is used for, if the first verification fails, re-determining the association relation, so as to re-perform the first operation verification.

In some embodiments, the replication unit 93 replicates the dependent environment and related resources of the module to be migrated in the first cloud system to the test area for performing the first operation verification; if the first verification fails, the determination unit 92 re-determines the dependent environment, so as to re-perform the first operation verification.

The establishment unit 94 is used for establishing association relation in the second cloud system to complete the migration of the first cloud system.

In some embodiments, the establishment unit 94 is used for building, in the second cloud system, a subnet corresponding to a topology structure relating to the module to be migrated in the first cloud system, to complete the migration of the first cloud system.

In some embodiments, the establishment unit 94 is used for building, in the test area, a subnet corresponding to a topology structure relating to the module to be migrated in the first cloud system, to perform the first operation verification.

In some embodiments, the verification unit 95 is used for, in a hybrid cloud system composed of the first cloud system and the second cloud system, performing a second operation verification on module to be migrated in the second cloud system using the association relation.

In some embodiments, the verification unit 95 is used for, re-performing the first operation verification, in the case that the second verification fails.

In some embodiments, the first cloud system is a public cloud system, and the second cloud system is a private cloud system; the verification unit 95 is used for verifying whether protected data of the private cloud system are accessible through the public cloud system; the migration apparatus 9 further comprises a processing unit 96 for performing an isolation process on the protected data in the private cloud system in the case that the protected data are accessible.

In some embodiments, if the hybrid cloud composed of the first cloud system and the second cloud system passes the operation test, a processing unit 96 deletes the module to be migrated from the first cloud system.

In some embodiments, the first cloud system is a private cloud system, and the second cloud system is a public cloud system; the processing unit 96 is used for isolating, from the public cloud system, protected data in the private cloud system.

In the above embodiment, the migration of module to be migrated in the first cloud system is completed by establishing the association relation of the module to be migrated in the second cloud system. In this way, mutual migration can be realized between different types of cloud systems, so as to meet different business requirements and improve the flexibility of the cloud system.

Figure 10:
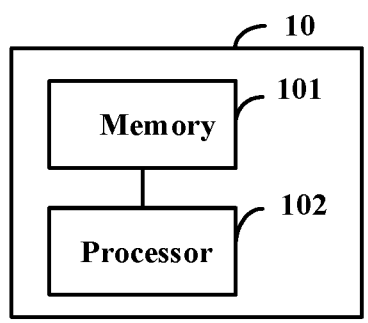
FIG. 10 shows a block diagram of other embodiments of the migration apparatus for cloud system of the present disclosure.

FIG. 10 shows a block diagram of other embodiments of the migration apparatus for cloud system of the present disclosure.

As shown in FIG. 10, the apparatus 10 for cloud system migration of this embodiment comprises: a memory 101 and a processor 102 coupled to the memory 101, the processor 102 configured to, based on instructions stored in the memory 101, carry out the migration method for cloud system according to any one of the embodiments of the present disclosure.

Wherein, the memory 101 may comprise, for example, system memory, a fixed non-transitory storage medium, or the like. The system memory stores, for example, an operating system, applications, a boot loader, a database, and other programs.

Figure 11:
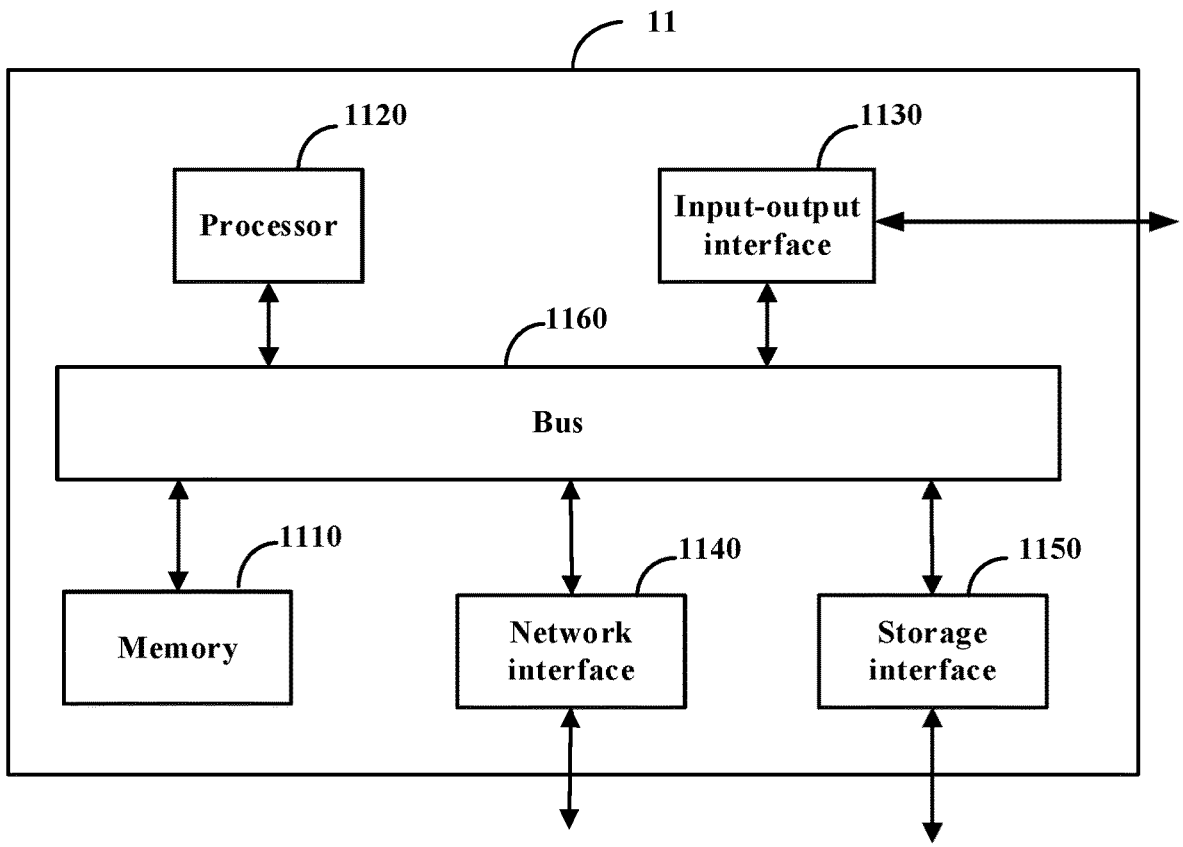
FIG. 11 shows a block diagram of still other embodiments of the migration apparatus for cloud system of the present disclosure.

FIG. 11 shows a block diagram of still other embodiments of the migration apparatus for cloud system of the present disclosure.

As shown in FIG. 11, the apparatus 11 for cloud system migration of this embodiment comprises: a memory 1110 and a processor 1120 coupled to the memory 1110, the processor 1120 configured to, based on instructions stored in the memory 1110, carry out the migration method for cloud system according to any one of the embodiments of the present disclosure.

The memory 1110 may comprise, for example, system memory, a fixed non-transitory storage medium, or the like. The system memory stores, for example, an operating system, applications, a boot loader, a database, and other programs.

The apparatus 11 for cloud system migration may further comprise an input-output interface 1130, a network interface 1140, a storage interface 1150, and the like. These interfaces 1130, 1140, 1150 and the memory 1110 and the processor 1120 may be connected through a bus 1160, for example. The input-output interface 1130 provides a connection interface for input-output devices such as a display, a mouse, a keyboard, and a touch screen. The network interface 1140 provides a connection interface for various networked devices. The storage interface 1150 provides a connection interface for external storage devices such as an SD card and a USB flash disk.

Figure 12:
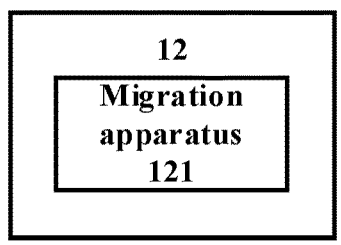
FIG. 12 shows a block diagram of some embodiments of a hybrid cloud system of the present disclosure.

FIG. 12 shows a block diagram of some embodiments of a hybrid cloud system of the present disclosure.

As shown in FIG. 12, the hybrid cloud system 12 comprises a migration apparatus 121 for implementing the migration method for cloud system according to any one of the above embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media having computer-usable program code embodied therein.

Heretofore, the migration method for cloud system, the migration apparatus for cloud system, the hybrid cloud system and the non-transitory computer-readable storage medium according to the present disclosure have been described in detail. In order to avoid obscuring the concepts of the present disclosure, some details known in the art are not described. Based on the above description, those skilled in the art can understand how to implement the technical solutions disclosed herein.

The method and system of the present disclosure may be implemented in many ways. For example, the method and system of the present disclosure may be implemented by software, hardware, firmware, or any combination of software, hardware, and firmware. The above sequence of steps of the method is merely for the purpose of illustration, and the steps of the method of the present disclosure are not limited to the above-described specific order unless otherwise specified. In addition, in some embodiments, the present disclosure may also be implemented as programs recorded in a recording medium, which comprise machine-readable instructions for implementing the method according to the present disclosure. Thus, the present disclosure also covers a recording medium storing programs for executing the method according to the present disclosure.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified without departing from the scope and spirit of the present disclosure. The scope of the disclosure is defined by the following claims.

What is claimed is:

1. A migration method for cloud system, comprising:
   dividing a business system in a first cloud system into multiple modules;
   determining an association relation between a module to be migrated of the multiple modules and other modules of the multiple modules;
   replicating the module to be migrated of the multiple modules to a second cloud system, wherein the first cloud system and the second cloud system are of different types; and
   establishing the association relation in the second cloud system to complete migration of the first cloud system;
   wherein replicating the module to be migrated of the multiple modules to the second cloud system comprises:
      replicating the module to be migrated to a test area of the first cloud system,. wherein the test area is a transition space separately in the first cloud system;
      performing a first operation verification on the module to be migrated in the test area of the first cloud system, using association relation established in the test area; and
      replicating the module to be migrated in the first cloud system to the second cloud system, in the case that the first verification is passed.

2. The migration method according to claim 1, further comprising:
   determining a dependent environment of the module to be migrated in the first cloud system; and
   replicating the dependent environment in the second cloud system to complete the migration of the first cloud system.

3. The migration method according to claim 1, further comprising:
   building, in the second cloud system, a subnet corresponding to a topology structure relating to the module to be migrated in the first cloud system, to complete the migration of the first cloud system.

4. The migration method according to claim 1, further comprising:
   re-determining an association relation between the module to be migrated and the other modules, in the case that the first verification fails; and
   re-performing the first operation verification according to a re-determined association relation.

5. The migration method according to claim 1, further comprising:
   replicating a dependent environment of the module to be migrated and resources relating to the module to be migrated in the first cloud system to the test area for performing the first operation verification;
   re-determining a dependent environment of the module to be migrated, in the case that the first verification fails; and
   re-performing a first operation verification according to a re-determined dependent environment.

6. The migration method according to claim 1, further comprising:
   building, in the test area, a subnet corresponding to a topology structure relating to the module to be migrated in the first cloud system, to perform the first operation verification.

7. The migration method according to claim 1, further comprising:
   performing a second operation verification on a module to be migrated in the second cloud system, using the association relation, in a hybrid cloud system composed of the first cloud system and the second cloud system.

8. The migration method according to claim 7, further comprising:
   re-performing the first operation verification, in the case that the second verification fails.

9. The migration method according to claim 1, wherein the first cloud system is a public cloud system, and the second cloud system is a private cloud system, the migration method further comprising:
verifying whether protected data of the private cloud system are accessible through the public cloud system; and
performing an isolation process on the protected data in the private cloud system, in the case that the protected data are accessible.

10. The migration method according to claim 1, further comprising:
deleting the module to be migrated from the first cloud system, in the case that a hybrid cloud composed of the first cloud system and the second cloud system passes an operation test.

11. The migration method according to claim 1, wherein the first cloud system is a private cloud system, and the second cloud system is a public cloud system, the migration method further comprising:
isolating, from the public cloud system, protected data in the private cloud system.

12. A migration apparatus for cloud system, comprising:
a memory; and
a processor coupled to the memory, the processor configured to, based on instructions stored in the memory, carry out a migration method for the cloud system comprising the following steps:
dividing a business system in a first cloud system into multiple modules;
determining an association relation between a module to be migrated of the multiple modules and other modules of the multiple modules;
replicating the module to be migrated of the multiple modules to a second cloud system, wherein the first cloud system and the second cloud system are of different types; and
establishing the association relation in the second cloud system to complete migration of the first cloud system;
wherein replicating the module to be migrated of the multiple modules to the second cloud system comprises:
replicating the module to be migrated to a test area of the first cloud system, wherein the test area is a transition space separately in the first cloud system;
performing a first operation verification on the module to be migrated in the test area of the first cloud system, using association relation established in the test area; and
replicating the module to be migrated in the first cloud system to the second cloud system, in the case that the first verification is passed.

13. A hybrid cloud system, comprising:
a migration apparatus for implementing the migration method for cloud system according to claim 1.

14. A non-transitory computer-readable storage medium on which a computer program is stored, which when executed by a processor implements a migration method for cloud system comprising the following steps:
dividing a business system in a first cloud system into multiple modules;
determining an association relation between a module to be migrated of the multiple modules and other modules of the multiple modules;
replicating the module to be migrated of the multiple modules to a second cloud system, wherein the first cloud system and the second cloud system are of different types; and
establishing the association relation in the second cloud system to complete migration of the first cloud system;
wherein replicating the module to be migrated of the multiple modules to the second cloud system comprises:
replicating the module to be migrated to a test area of the first cloud system, wherein the test area is a transition space separately in the first cloud system;
performing a first operation verification on the module to be migrated in the test area of the first cloud system, using association relation established in the test area; and
replicating the module to be migrated in the first cloud system to the second cloud system, in the case that the first verification is passed.

15. The non-transitory computer-readable storage medium according to claim 14, wherein the computer program which when executed by the processor implements the following steps:
determining a dependent environment of the module to be migrated in the first cloud system; and
replicating the dependent environment in the second cloud system to complete the migration of the first cloud system.

16. The non-transitory computer-readable storage medium according to claim 14, wherein the computer program which when executed by the processor implements the following steps:
building, in the second cloud system, a subnet corresponding to a topology structure relating to the module to be migrated in the first cloud system, to complete the migration of the first cloud system.

17. The non-transitory computer-readable storage medium according to claim 14, wherein the computer program which when executed by the processor implements the following steps:
replicating the module to be migrated to a test area of the first cloud system;
performing a first operation verification on the module to be migrated in the test area of the first cloud system, using association relation established in the test area; and
replicating the module to be migrated in the first cloud system to the second cloud system, in the case that the first verification is passed.

18. The non-transitory computer-readable storage medium according to claim 17, wherein the computer program which when executed by the processor implements the following steps:
re-determining an association relation between the module to be migrated and the other modules, in the case that the first verification fails; and
re-performing the first operation verification according to a re-determined association relation.

19. The non-transitory computer-readable storage medium according to claim 17, wherein the computer program which when executed by the processor implements the following steps:
replicating a dependent environment of the module to be migrated and resources relating to the module to be migrated in the first cloud system to the test area for performing the first operation verification;

re-determining a dependent environment of the module to be migrated, in the case that the first verification fails; and re-performing a first operation verification according to a re-determined dependent environment.

\* \* \* \* \*